(12) United States Patent
Moon et al.

(10) Patent No.: US 12,431,507 B2
(45) Date of Patent: Sep. 30, 2025

(54) ELECTROLYTIC COPPER FOIL AND SECONDARY BATTERY COMPRISING THE SAME

(71) Applicant: Volta Energy Solutions S.a.r.l., Luxembourg (LU)

(72) Inventors: Honggi Moon, Wiltz (LU); Sangbeom Kim, Wiltz (LU); Seunghwan Kim, Wiltz (LU)

(73) Assignee: Volta Energy Solutions S.a.r.l., Luxembourg (LU)

( * ) Notice: Subject to any disclaimer, the term of this patent is extended or adjusted under 35 U.S.C. 154(b) by 503 days.

(21) Appl. No.: 18/076,771

(22) Filed: Dec. 7, 2022

(65) Prior Publication Data
US 2023/0207829 A1 Jun. 29, 2023

(30) Foreign Application Priority Data

Dec. 24, 2021 (WO) ................. PCT/EP2021/087639

(51) Int. Cl.
*H01M 4/66* (2006.01)
*C25D 3/38* (2006.01)

(52) U.S. Cl.
CPC .............. *H01M 4/661* (2013.01); *C25D 3/38* (2013.01); *H01M 4/667* (2013.01)

(58) Field of Classification Search
CPC .......... H01M 4/661; H01M 4/667; C25D 3/38
USPC ........................................................ 429/245
See application file for complete search history.

(56) References Cited

U.S. PATENT DOCUMENTS

| 10,826,052 B1 | 11/2020 | Huang et al. |
| 2011/0311834 A1 | 12/2011 | Hanafusa |
| 2012/0193238 A1 | 8/2012 | Park et al. |
| 2015/0267313 A1 | 9/2015 | Chou et al. |

FOREIGN PATENT DOCUMENTS

| CN | 111005041 A | 4/2020 | |
| EP | 3540832 A1 * | 9/2019 | ............... C25D 1/04 |
| KR | 10-0694382 B1 | 3/2007 | |
| KR | 10-2019-0009048 A | 1/2019 | |
| WO | 2013/146088 A1 | 10/2013 | |

OTHER PUBLICATIONS

Communication dated Sep. 18, 2023, issued in European Application No. 22193713.9.

* cited by examiner

*Primary Examiner* — James M Erwin
(74) *Attorney, Agent, or Firm* — Sughrue Mion, PLLC

(57) ABSTRACT

An electrolytic copper foil having improved elongation and electrical conductivity is disclosed. The improved elongation and electrical conductivity are due to an increase in shape deformation of grains selective to a specific direction and an increase in an average grain size after heat treatment. An electrode for a secondary battery including the electrolytic copper foil, and a secondary battery including the electrode are disclosed.

20 Claims, 6 Drawing Sheets

(5 of 6 Drawing Sheet(s) Filed in Color)

ELECTROLYTIC COPPER FOIL AND SECONDARY BATTERY COMPRISING THE SAME

CROSS REFERENCE TO RELATED APPLICATIONS

This application claims priority based on PCT/EP2021/087639 filed Dec. 24, 2021, the content of which is incorporated by reference in its entirety.

TECHNICAL FIELD

The present invention relates to an electrolytic copper foil having improved elongation and electrical conductivity due to an increase in shape deformation of grains selective to a specific direction and an increase in an average grain size after heat treatment, to an electrode for a secondary battery including the electrolytic copper foil, and to a secondary battery including the electrode.

DISCUSSION OF RELATED ART

In general, an electrolytic copper foil is widely used as a basic material of a printed circuit board (PCB) used in the electric/electronic industry. In addition, by improving the physical properties of the electrolytic copper foil, it is widely used as an anode current collector of a secondary battery. Accordingly, the demand for such an electrolytic copper foil is rapidly increasing mainly in small products such as slim notebook computers, personal digital assistants (PDA), e-books, MP3 players, next-generation mobile phones, and ultra-thin flat panel displays.

Such an electrolytic copper foil is prepared in a manner in which sulfuric acid-aqueous solution of copper sulfate is used as an electrolyte, an electrodeposited copper is precipitated on a drum surface by applying a direct current between an anode (e.g., a positive electrode) and a rotating cathode drum (e.g., a negative electrode) immersed in the electrolyte, and the precipitated copper electrodeposits is stripped from the drum surface of the rotating cathode and continuously wound.

Meanwhile, in order to use the electrolytic copper foil as a current collector of a printed circuit board or a secondary battery, it should have various physical properties such as predetermined tensile strength and elongation. In particular, when such an electrolytic copper foil is used as a current collector of a lithium secondary battery, it should have excellent physical properties so that the performance of the secondary battery may be maintained even if severe conditions are repeatedly formed inside the secondary battery according to charging and discharging of the secondary battery. However, it is difficult to satisfy the desired physical properties of the copper foil only by the above-described foil preparing process. In addition, in order to improve the physical properties of the electrolytic copper foil, it is necessary to perform a separate surface treatment, resulting in complexity of the process and an increase in manufacturing costs.

Technical Objectives

Aspects of embodiments of the present invention are directed to an electrolytic copper foil having improved elongation and electrical conductivity due to an increase in shape deformation of grains selective to a specific direction and an increase in an average grain size after heat treatment.

Aspects of embodiments of the present invention are further directed to an electrode for a secondary battery including the electrolytic copper foil, and to a secondary battery including the electrode.

Other objectives and advantages of the present invention may be more clearly explained by the following detailed description and claims.

Technical Solution to the Problem

According to an embodiment, an electrolytic copper foil comprises a copper layer including one surface and another surface, wherein and the copper layer includes a plurality of grains, and when analyzed by electron backscatter diffraction (EBSD) after heat treatment at 200° C. for 1 hour, a grain rate (G rate) defined in Equation 1 is 50% or more:

$$\text{Grain rate } (G \text{ rate},\%) = G_{1/3}/G_T \geq 50, \quad \text{[Equation 1]}$$

In Equation 1, $G_T$ is a total area of grains comprised in the heat-treated electrolytic copper foil, and $G_{1/3}$ is a total area of grains of which a ratio (a/b) of a maximum length in a width direction (a) to a maximum length in a thickness direction (b) of a unit grain excluding twin boundaries in the heat-treated electrolytic copper foil is ⅓ or more.

In some embodiments, when analyzed by EBSD after heat treatment at 200° C. for 1 hour, the grate rate (G rate) of the electrolytic copper foil may be in a range from 50 to 97%.

In some embodiments, an average grain size (excluding twins) of the electrolytic copper foil after heat treatment may be in a range from 4 to 10 μm, and an average grain size (excluding twins) before heat treatment may be in a range from 1 to 6 μm.

In some embodiments, an electrical conductivity of the electrolytic copper foil after heat treatment may be 1.5% or more greater as compared to an electrical conductivity of the electrolytic copper foil before heat treatment.

In some embodiments, an electrical conductivity of the electrolytic copper foil after heat treatment may be in a range from 40 to 55 MS/m, and an electrical conductivity of the electrolytic copper foil before heat treatment may be in a range from 38 to 45 MS/m.

In some embodiments, an elongation after heat treatment may be 10% or more, and a tensile strength after heat treatment may be 38 kgf/mm² or less.

In some embodiments, a thickness of the electrolytic copper foil may be in a range from 3 to 70 μm.

In some embodiments, a roughness of each of the one surface and the another surface of the electrolytic copper foil may be in a range from 0.5 to 5.0 μm, and a difference in surface roughness between the one surface and the another surface may be 1.0 μm or less.

In some embodiments, the electrolytic copper foil may further include an anti-corrosion layer formed on a surface of the electrolytic copper foil, wherein the anti-corrosion layer may include at least one of chromium (Cr), molybdenum (Mo), nickel (Ni), a silane compound, and a nitrogen compound.

In some embodiments, the electrolytic copper foil may be formed through electroplating in which a current is applied between an electrode plate and a rotating drum which are spaced apart from each other in an electrolyte, and the electrolyte may include 50 to 150 g/l of copper ions, 50 to 150 g/l of sulfuric acid, 1 to 100 ppm of halogen, 3 to 1500 ppb of a brightener, 3 to 4000 ppb of a low molecular weight gelatin, 3 to 3000 ppb of HEC, and 1 to 20 ppb of a leveler.

In some embodiments, the electrolytic copper foil may be applied as an anode current collector for a lithium secondary battery.

According to an embodiment, a secondary battery includes the anode current collector for a lithium secondary battery including the electrolytic copper foil.

Effects of the Invention

According to one or more embodiments of the present invention, an electrolytic copper foil having improved elongation and electrical conductivity due to an increase in shape deformation of grains selective to a specific direction and an increase in an average grain size after heat treatment may be provided.

Accordingly, when such an electrolytic copper foil according to the present invention is used as a current collector for a battery, quality reliability may be continuously maintained during a manufacturing process and during use of the secondary battery, and excellent overall performance of the battery may be exhibited.

Effects of the present invention are not limited by the contents exemplified above, and more various effects are included in the present specification.

BRIEF DESCRIPTION OF THE DRAWING PORTIONS

The patent or application file contains at least one drawing executed in color. Copies of this patent or patent application publication with color drawing(s) will be provided by the Office upon request and payment of the necessary fee.

REFERENCE NUMERAL

100: Copper foil
10a: One surface (drum surface)
10b: Another surface (electrolyte surface)
20: Anti-corrosion layer

DETAILED DESCRIPTION OF THE INVENTION

Hereinafter, the present invention will be described in detail.

All terms (including technical and scientific terms) used in this specification may be used in the meaning commonly understood by those of ordinary skill in the art to which the present invention pertains, unless otherwise defined. In addition, terms defined in a commonly used dictionary are not to be interpreted ideally or excessively, unless clearly defined in particular.

In addition, throughout this specification, when a part "includes" or "comprises" a certain element, it is to be understood as an open-ended term that includes the possibility of further including other elements rather than excluding other elements, unless otherwise stated. In addition, throughout the specification, "on" or "above" means not only when it is located on or beneath a target part, but also includes the case where there is another part therebetween, and does not mean that it is located upwardly with respect to the direction of gravity. In the present specification, terms such as "first" and "second" do not indicate any order or importance but are used to distinguish components from each other.

As used herein, "preferred" and "preferably" refer to embodiments of the present invention that may provide certain advantages under certain circumstances. However, other embodiments may also be preferred, under the same or other circumstances. Additionally, the recitation of one or more preferred embodiments does not imply that other embodiments are not useful, nor is it intended to exclude other embodiments from the scope of the invention.

<Electrolytic Copper Foil>

An example of the present invention is an electrolytic copper foil (e.g., an electrodeposition copper foil) applicable to a current collector of a secondary battery or a copper foil for improving signal loss, for example, a copper clad laminate (CCL), a printed circuit board (PCB), and the like.

Such an electrolytic copper foil is different from the conventional electrolytic copper foil in that shape and size of grains are deformed after being heat treated under a predetermined condition, while exhibiting a high strain (e.g., shape deformation rate) in a specific direction and having an average grain size increased beyond a predetermined range.

Figure 1:
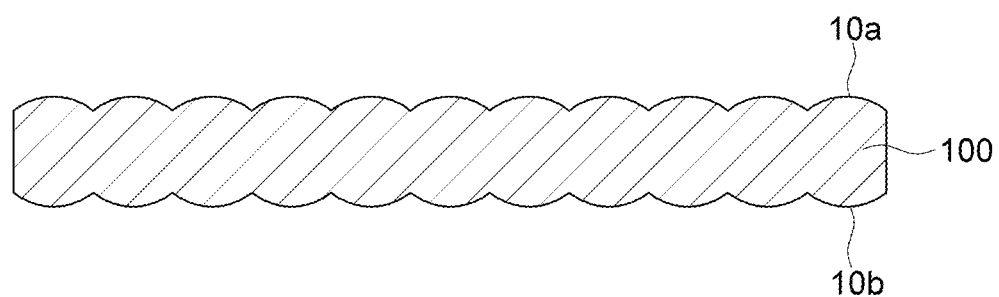
FIG. 1 is a cross-sectional view illustrating a structure of an electrolytic copper foil according to an embodiment of the present invention.

Hereinafter, a structure of an electrolytic copper foil according to the present invention will be described with reference to FIG. 1. FIG. 1 is a cross-sectional view illustrating a structure of an electrolytic copper foil according to the present invention.

Referring to FIG. 1, the electrolytic copper foil 100 comprises a copper layer including one surface 10a and another surface 10b, the copper layer includes a plurality of grains, where a grain rate ("G rate") may be 50% or more when analyzed by electron backscatter diffraction (EBSD) after heat treatment at 200° C. for 1 hour.

The grain rate is a parameter newly defined in the present invention and is calculated from tissue analysis by EBSD. Specifically, it may be defined as in Equation 1 below:

$$\text{Grain rate } (G \text{ rate},\%) = G_{1/3}/G_T \geq 50, \qquad \text{[Equation 1]}$$

In the Equation 1, $G_T$ is a total area of grains included in the heat-treated copper foil, and $G_{1/3}$ is a total area of grains of which a ratio (a/b) of a maximum length in a width direction (a) to a maximum length in a thickness direction (b) of a unit grain excluding twin boundaries in the heat-treated copper foil is ⅓ or more.

The electron backscatter diffraction (EBSD) used in calculating the grain rate is a technique of analyzing orientation of a material in a manner where a sample is mounted on a scanning electron microscope (SEM) and an electron (backscattered electrons) reflected when accelerated electrons are injected into a sample is detected. The information obtained from the analysis of grains according to EBSD includes information up to a depth of several 10 nm at which an electron beam penetrates the sample. Such EBSD may be analyzed based on the results of orientation and diffraction patterns of the materials analyzed using a pattern quality map (PQ map) and an inverse pole figure map (IPF map). In such a case, the PQ Map expresses a difference in a signal intensity of electric charges (e.g., electrons, backscattered electrons) reflected from the sample as a difference in contrast (e.g., light and dark), and is generally expressed darkly at grain boundaries because the signal is weak. In addition, the IPF Map expresses a difference in a crystal direction (orientation) of the sample in color. The term "twin" means a plane that is 60° misorientated with respect to a crystal plane of the sample.

Figure 5A:
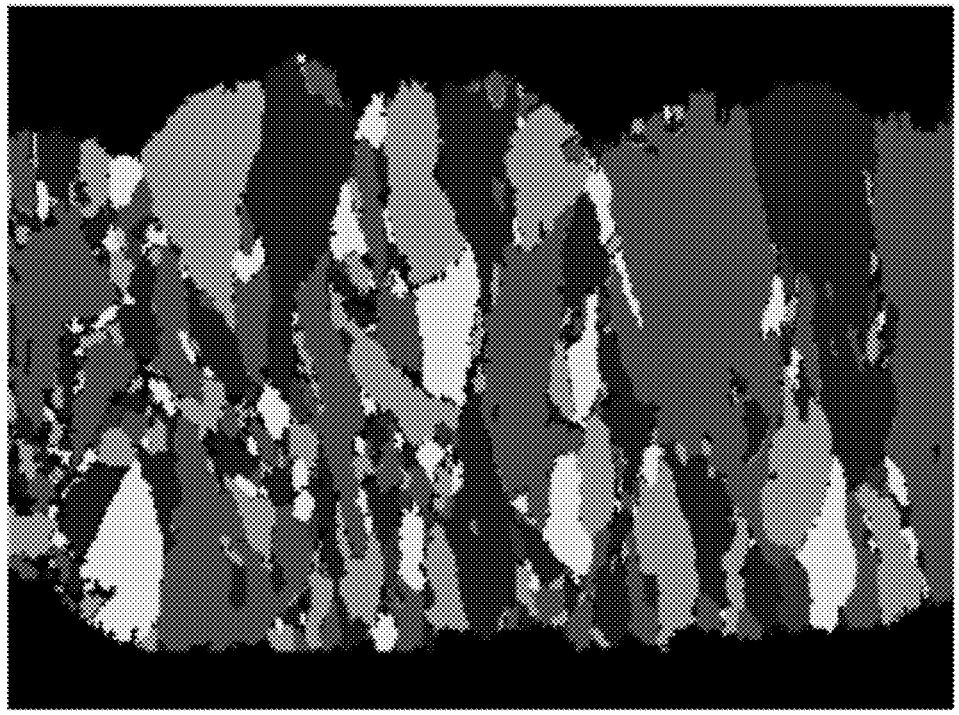
FIG. 5A and FIG. 5B are EBSD images of an electrolytic copper foil prepared in Comparative Example 1 before and after heat treatment.
Figure 5B:
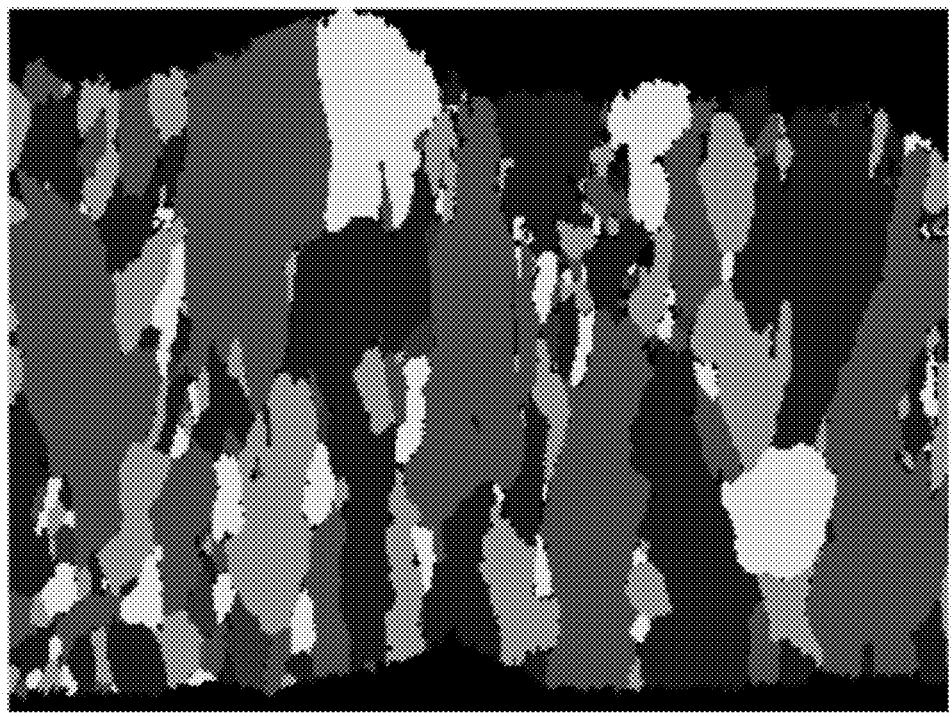
Figure 6:
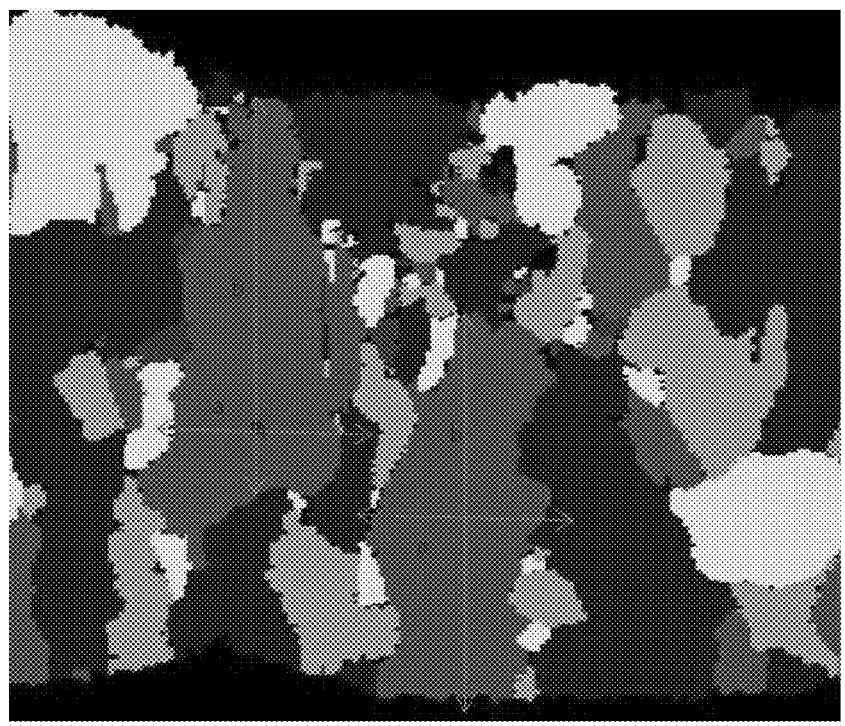
FIG. 6 is a view illustrating a maximum length in a thickness direction ("b") and a maximum length in a width direction ("a") of a unit grain in the EBSD image after heat treatment of the electrolytic copper foil prepared in Comparative Example 1.

Specifically, the electrolytic copper foil includes a plurality of irregularly crystallized grains. When such an electrolytic copper foil is heat-treated, size and shape of a unit grain partially tend to increase due to agglomeration or coalescing by heat, but this tendency did not show selectivity in a specific direction, and the effect of the increase in the grain size was also relatively small. That is, in the conventional electrolytic copper foil, a shape strain rate in the thickness direction (b) of the copper foil after heat treatment and a shape strain rate in the width direction (or length direction, a) of the copper foil after heat treatment were equal to each other, or even if the shape strain rate in a specific direction was partially large, it did not show high selectivity and high dependence on specific directions (see FIG. 5A and FIG. 5B).

On the other hand, in the electrolytic copper foil according to the present invention, after heat treatment under predetermined conditions, the shape of grains is not equally deformed along all directions, but the electrolytic copper foil according to the present invention shows a shape strain rate which is selectively high in a specific direction. That is, after heat treatment, a ratio (a/b) of the shape strain rate in the width direction (or length direction, a) to the shape strain rate in the thickness direction (b) of the grains, that is, the grain rate, is significantly increased by about 30% or more. In addition, an effect of a significantly increased average grain size as compared to the conventional electrolytic copper foil is also exhibited.

As described above, when the grain rate (G rate) is high, it means that the grain increases in the width direction (or length direction) of the copper foil, which indicates that a grain orientation is small in the width direction (or length direction) of the copper foil. As such, when the grain is selectively increased in the width direction of the copper foil, movement of electrons is made in the width direction (length direction) of the copper foil, so resistance due to the grain boundary is reduced, and when measuring the elongation, fracture due to grain boundaries is minimized and the elongation is increased. That is, as the grain rate (G rate) increases, electrical conductivity and elongation of the copper foil increase, and as a result, it is possible to provide an electrolytic copper foil having significantly improved elongation and electrical conductivity characteristics.

Since the above-described grain rate (G rate) parameter after heat treatment is a unique physical property of the electrolytic copper foil according to the present invention, the grain rate (G rate) parameter may correspond to a novel technical characteristic that distinguishes the electrolytic copper foil according to the present invention from the conventional electrolytic copper foil. Such a grain rate may have some different values depending on the EBSD measurement method and the measurement conditions.

For example, the electrolytic copper foil 100 may have a grain rate (G rate) in a range from 50 to 97%, more specifically 55 to 95%, when analyzed by EBSD after heat treatment at 200° C. for 1 hour. In the case of the electrolytic copper foil of the present invention that satisfies the above-mentioned grain rate (G rate) value, it may exhibit an effect of increase in terms of elongation and electrical conductivity and thus it is possible to continuously maintain quality reliability when applied to a battery.

In addition, the electrolytic copper foil 100 of the present invention also has the effect of significantly increasing the average grain size after heat treatment.

For example, the average grain size (excluding twins) after heat treatment may be 10% or more larger than an average grain size before heat treatment. Specifically, the average grain size (excluding twins) after heat treatment may be in a range from 4 to 10 μm, and the average grain size (excluding twins) before heat treatment may be in a range from 1 to 6 μm.

As described above, in the case of the electrolytic copper foil of the present invention having a predetermined grain rate (G rate) parameter and corresponding numerical value after heat treatment, it has an effect of improving elongation and electrical conductivity, while exhibiting an effect of reducing tensile strength. In addition, it has excellent flexibility to suppress occurrence of cracks that may occur due to repeated flexural fatigue, thereby exhibiting excellent quality reliability.

For example, the electrical conductivity of the copper foil after heat treatment at 200° C. for 1 hour may be 1.5% or more greater, and specifically may be greater by a range from 2 to 8%, as compared to an electrical conductivity of the copper foil before heat treatment. For example, the electrical conductivity of the copper foil after heat treatment may be in a range from 40 to 55 MS/m, and the electrical conductivity of the copper foil before heat treatment may be in a range from 38 to 45 MS/m.

For example, after heat treatment at 200° C. for 1 hour, the elongation of the copper foil may be 10% or more, specifically in a range from 10 to 30%, and more specifically in a range from 12 to 25%. In addition, the tensile strength of the copper foil after heat treatment at 200° C. for 1 hour may be 38 kgf/mm$^2$ or less, specifically in a range from 20 to 38 kgf/mm$^2$, and more specifically in a range from 23 to 35 kgf/mm$^2$. In such a case, the elongation may be lowered when the thickness of the copper foil becomes thinner.

The electrolytic copper foil 100 according to the present invention may be an electrolytic copper foil prepared through a foil forming process by an electroplating method in which, for example, one surface of the electrolytic copper foil 100 has a shiny surface (e.g., an "S surface," a drum surface, etc.) 10a which has a relatively low roughness and thus has a high gloss, and another surface of the copper foil has a matte surface (e.g., an "M surface", an electrolyte surface, etc.) 10b which has a relatively high roughness due to so-called mountain structures and thus has a low gloss.

In such a case, a bonding force with an active material and a yield of the battery may greatly vary depending on a surface state of the electrolytic copper foil 100 which is used as the current collector. For example, when surface non-uniformity due to the surface roughness of the copper foil is too high, there is a problem in that a discharge-capacity retention rate of the secondary battery is lowered, and on the other hand, when the surface of the copper foil is too uniform, it may be difficult to secure the binding force between the current collector and the active material, and thus the active material may be desorbed from the current collector during operation of the secondary battery, thereby causing problems such as an internal short circuit. In addition, according to a state of the copper foil, a difference in a coating amount of the active material between the opposite surfaces may be caused. The non-uniform coating amount between the opposite surfaces may cause a problem that a capacity of the electrode may decrease and/or unstable behavior of the electrode may occur due to a difference in deformation between the opposite surfaces of the current collector. Accordingly, in an embodiment of the present invention, by adjusting the surface roughness of the opposite surfaces of the electrolytic copper foil 100 to a predetermined range, it is possible to secure required physical properties of the electrolytic copper foil 100 as a current collector, that is, an excellent bonding strength with the active materials and a high discharge capacity retention rate.

In an example, the electrolytic copper foil 100 includes a drum surface (e.g., one surface, 10a) and an electrolyte surface (e.g., another surface, 10b), and a surface roughness of the opposite surfaces 10a and 10b may be approximately in a range from 0.5 to 5.0 µm, in terms of Rz (ten-point average roughness), and specifically in a range from 1.0 to 4.0 µm. More specifically, the surface roughness of the drum surface (e.g., S surface, 10a) of the copper foil may be in a range from 1.0 to 2.5 µm, and the surface roughness of the electrolyte surface (e.g., M surface 10b) may be in a range from 1.0 to 2.5 µm.

In another example, a difference in surface roughness between the drum surface 10a and the electrolyte surface 10b of the electrolytic copper foil 100 may be 1.0 µm or less, and specifically, 0.5 µm or less.

In addition, a thickness of the electrolytic copper foil 100 may have a typical thickness range known in the art, for example, in a range from 3 µm to 70 µm. Specifically, it may be in a range from 10 to 35 µm (STD copper foil), in a range from 4 to 18 µm (BF copper foil), and in a range from 4 to 12 µm (SR copper foil), but the present invention is not particularly limited thereto. When the thickness of the electrolytic copper foil 100 is too thin to be less than about 3 µm, it is difficult to handle the copper foil in a process of manufacturing the battery, lowering the workability, and on the other hand, when the thickness of the electrolytic copper foil 100 exceeds about 70 µm, it is difficult to manufacture a high-capacity battery because volume and weight may increase due to a thickness of a current collector when the electrolytic copper foil 100 is used as a current collector.

The electrolytic copper foil 100 according to an embodiment of the present invention is not particularly limited in terms of, for example, components, composition, and/or structure constituting the copper foil, as long as the predetermined grate rate (G rate) parameter after heat treatment and related characteristics are satisfied.

The electrolytic copper foil 100 may include or be formed of conventional copper or a copper alloy known in the art, and a metal component included in the alloy is not particularly limited, and a conventional metal known in the art may be used. For example, the copper foil may be a standard battery foil (STD) or a copper foil for electric vehicle batteries (BF), or a high elongation (SR) copper foil, but embodiments are not particularly limited thereto. The electrolytic copper foil 100 may be in the shape of a foil, specifically, may be a flat copper foil.

In an example, the electrolytic copper foil 100 is preferably an electro-deposition copper foil formed through electroplating in which a current is applied between an electrode plate and a rotating drum which are spaced apart from each other in an electrolyte. The electrolyte may have a composition including 50 to 150 g/l of copper ions, 50 to 150 g/l of sulfuric acids, 1 to 100 ppm of halogens, 3 to 1500 ppb of brighteners, 3 to 4000 ppb of low molecular weight gelatins, 3 to 3000 ppb of HEC, and 1 to 20 ppb of levelers, but embodiments are not particularly limited thereto.

In addition, unless otherwise specified, the above-described physical properties may be based on a thickness in a range from 3 to 70 µm of the copper foil. However, embodiments of the present invention are not limited to the above-described thickness range, and may be appropriately adjusted within a typical thickness range known in the art.

Figure 2:
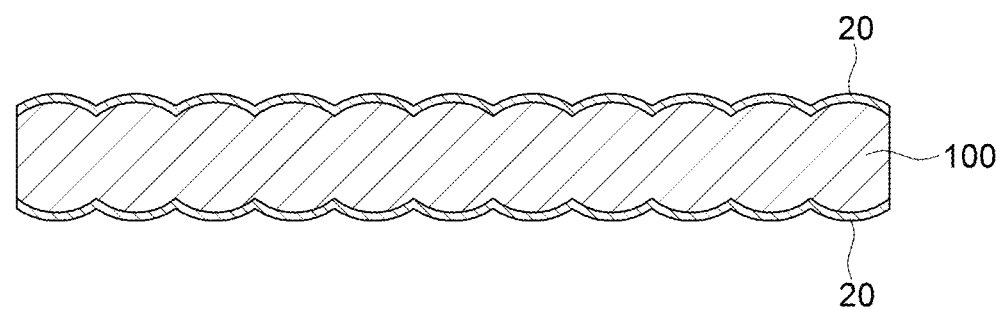
FIG. 2 is a cross-sectional view illustrating a structure of an electrolytic copper foil according to another embodiment of the present invention.
Figure 3A:
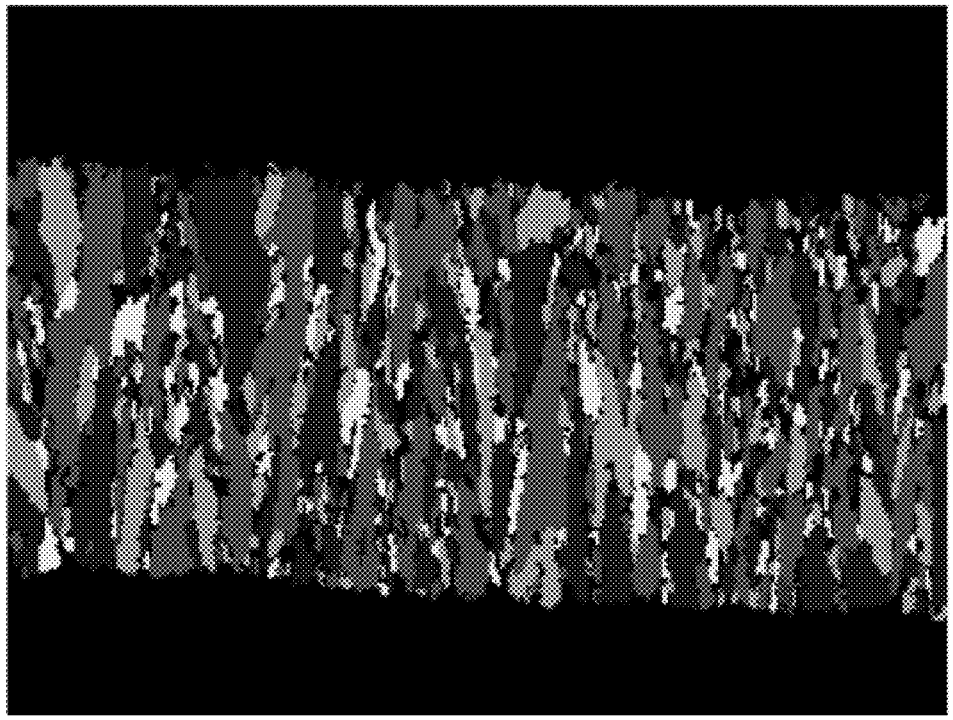
FIG. 3A and FIG. 3B are electron backscatter diffraction (EBSD) images of an electrolytic copper foil prepared in Example 4 before and after heat treatment.
Figure 3B:
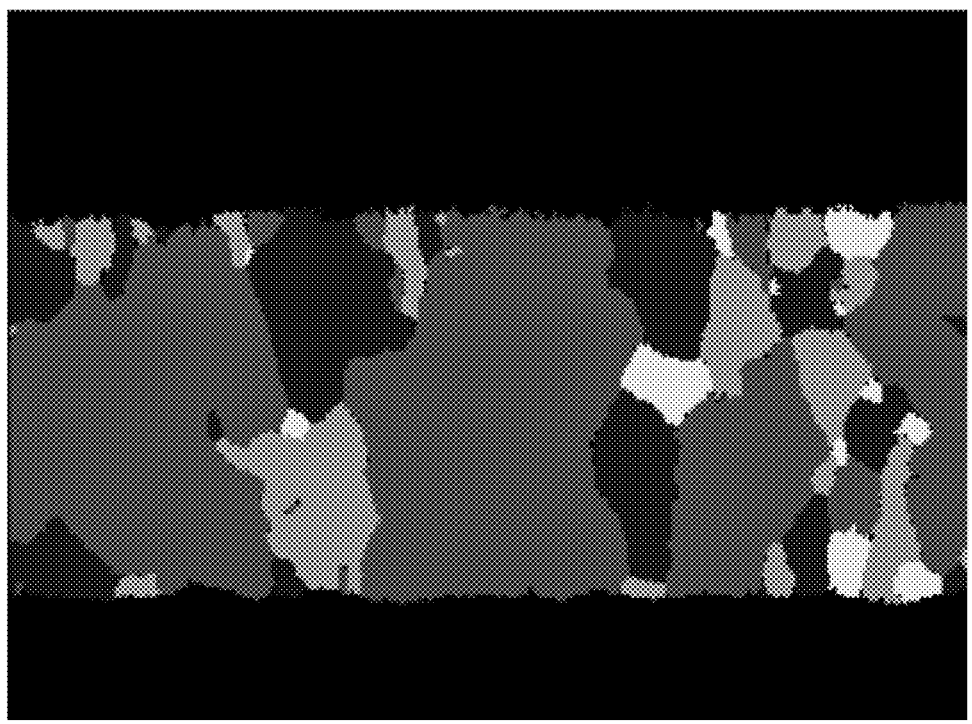
Figure 4:
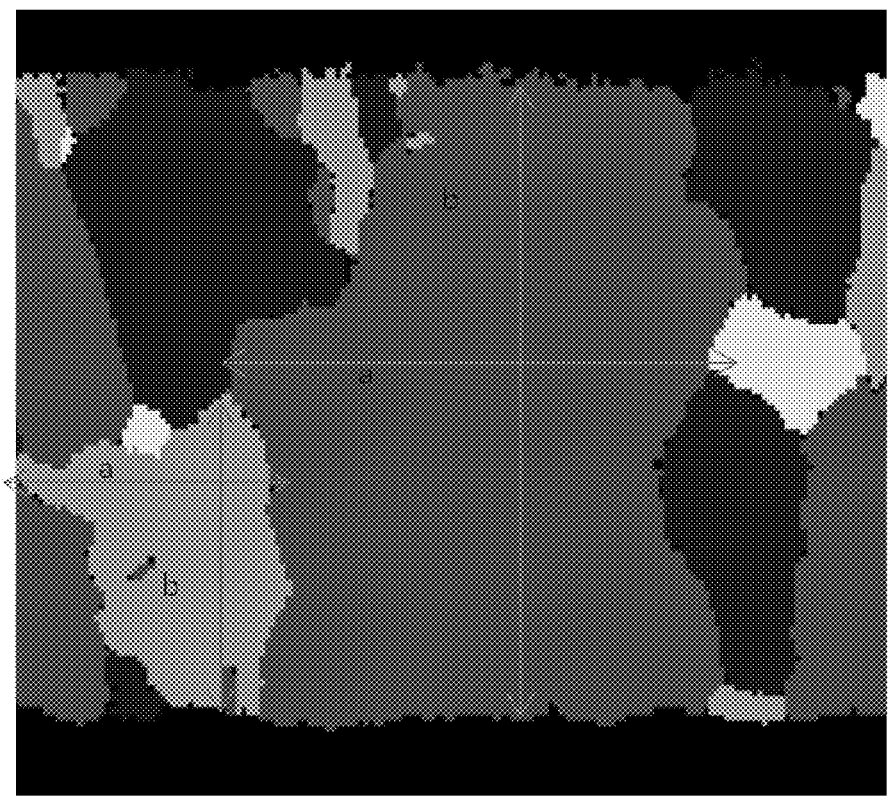
FIG. 4 is a view illustrating a maximum length in a thickness direction ("b") and a maximum length in a width direction ("a") of a unit grain in the EBSD image after heat treatment of the electrolytic copper foil prepared in Example 4.

In an embodiment, referring to FIG. 2, the electrolytic copper foil 100 according to an embodiment of the present invention may include an anti-corrosion layer 20 formed on the surfaces 10a and 10b thereof.

The anti-corrosion layer 20 is selectively formed on the surfaces 10a and 10b of the electrolytic copper foil 100 to prevent corrosion (e.g., rust). The anti-corrosion layer 20 may include conventional inorganic corrosion-resistant (e.g., rust-preventive) materials, organic corrosion-resistant materials, or mixtures thereof known in the art, for example, at least one or more of chromium (Cr), molybdenum (Mo), nickel (Ni), a silane compound, and a nitrogen compound.

In such a case, the nitrogen compound may include at least one or more of common triazole compounds and amine compounds known in the art. The applicable triazole compound may be selected from, for example, benzotriazole, tolyltriazole, carboxybenzotriazole, chlorobenzotriazole, ethylbenzotriazole and naphthotriazole. In addition, available amine compounds may be selected from, for example, amide, acrylamide, acetamide, auramine, dodecyltrimethyl ammonium bromide (DTAB) and diethylenetriamine (DETA).

The anti-corrosion layer 20 may serve to impart not only the anti-corrosion properties to the electrolytic copper foil 100 described above, but also heat-resistance properties and/or properties to increase a bonding strength with active materials.

The electrolytic copper foil 100 according to an embodiment of the present invention may be prepared through a conventional electrolytic foil-forming apparatus, but embodiments are not particularly limited thereto. For example, a drum, which serves as a cathode, and an anode are installed in a container to which an electrolyte is continuously supplied, and a current is applied in a state that the drum and the anode are spaced apart from each other so that the electrolyte may be interposed therebetween. In such a case, as the drum rotates, an electrolytic copper foil is electro-deposited on a surface of the drum, and then it is wound through a guide roll.

In such a case, a conventional electroplating electrolyte component known in the art may be used as the electrolyte without particular limitation, and may include, for example, copper sulfate, sulfuric acid and a trace amount of chlorine as main components and may include at least one conventional plating additive.

As the additive, additives commonly used in the electroplating field may be used without limitation, and examples thereof may include an accelerator, a brightener, a smoothing agent, a suppressor (e.g., inhibitor), or a mixture thereof.

The accelerator/brightener is added to give gloss to a plating surface and to obtain a fine plating layer, and may include, for example, organic substances including disulfide bond (—S—S—) and a mercapto group (—SH) or a sulfonate-based additive including sulfide. Specific examples thereof may include at least one of 3-mercaptopropyl sulfonate (MPS), bis-(3-sulfopropyl)-disulfide (SPS), 3-N,N-dimethlyamonodithiocarbamoy-1-propanesulfonic acid (DPS), and polymethyldithiocarbonic amine-sulfopropylsulfonate (PTA).

The suppressor/carrier adsorbs on a surface to slow the electroplating by interfering with the access of copper ions, and is a component added to realize stable low roughness. For example, polymer-based organic compounds such as hydroxyethyl cellulose (HEC), polyethylene glycols (PEG), polypropylene glycols (PPG), polyvinyl alcohols, low molecular weight gelatin (molecular weight: about 1,000 to 100,000), cellulose-based additives, and collagen, or a mixture thereof may be used. In addition, an organic material including a polyether-based polymer material and a functional group including a nitrogen atom, a sulfosuccinate-based surfactant, and/or an ethandiamineoxirane-based surfactant may be used.

The leveler/flattener is a component added to obtain a flat (e.g., planar), low-roughness copper foil by removing surface steps. For example, low molecular weight nitrides (e.g., thiourea series, amides, benzimidazole series, benthiazol series, dimethyl aniline, etc.) may be used, and specifically, thiourea, JGB (Janus Green B), PEI, 3-(benzothiazolyl-2-mercapto)-propyl-sulfonic acid may be used.

In an example, the electrolyte includes, for example, 50 to 150 g/l of copper ions, 50 to 150 g/l of sulfuric acid, and 1 to 100 ppm of halogens, 3 to 1500 ppb of at least one additive for increasing a grain size after heat treatment is further included, and at least one additive suppressing the growth of the grain size after heat treatment is further added in a controlled amount of 1 to 4000 ppb.

In the present invention, the additive for increasing the grain size after heat treatment may include at least one of a brightener and an accelerator. In addition, the additive for suppressing the growth of the grain size after heat treatment may include a leveler or the like.

A specific composition of the additive added to the electrolyte may include 3 to 1500 ppb of the brightener, 3 to 4000 ppb of the low molecular weight gelatin, 3 to 3000 ppb of HEC, and 1 to 20 ppb of the leveler.

In addition, the electroplating conditions applied at the time of electrodeposition of the electrolytic copper foil are not particularly limited, and may be appropriately adjusted within a range known in the art. For example, a current density may be in a range from 30 ASD (A/dm$^2$) to 100 ASD, and a temperature of the electrolyte may be in a range from 40 to 70° C.

Factors such as a difference in surface roughness between the M surface (e.g., 10a) and the S surface (e.g., 10b) of the copper foil may be controlled by controlling the composition of the above-described electrolyte, current density, temperature, type and/or content of the additives.

<Electrode>

Another embodiment of the present invention is an electrode for secondary batteries including the above-described electrolytic copper foil as a current collector.

In a lithium secondary battery, for example, a foil including aluminum (Al) is generally used as a cathode (e.g., positive electrode) current collector combined with a cathode active material, and a foil including copper (Cu) is generally used as an anode (e.g., negative electrode) current collector combined with an anode active material. Accordingly, in the present invention, a case in which the electrolytic copper foil 100 is applied as an anode current collector will be described.

In an example, the anode includes the above-mentioned electrolytic copper foil; and an anode active material layer disposed on the electrolytic copper foil.

The anode active material layer includes an anode active material, and may further include a conventional binder and/or a conductive material known in the art.

The anode active material is not particularly limited as long as it is a compound capable of intercalation and deintercalation of ions. Non-limiting examples of applicable anode active materials may include, but may not be limited to, carbon-based and silicon-based anode active materials, and in addition, lithium metal or alloys thereof, and other metal oxides such as $TiO_2$, $SnO_2$ and $Li_4Ti_5O_{12}$ capable of occluding and releasing lithium and having an electric potential of less than 2 V with respect to lithium may be used.

Since a method of manufacturing an electrode for secondary batteries using the above-described electrolytic copper foil is known to those skilled in the art to which the present invention pertains, a detailed description thereof will be omitted.

<Secondary Battery>

A secondary battery according to another embodiment of the present invention includes an anode (e.g., negative electrode) including the above-described electrolytic copper foil.

The secondary battery may be a lithium secondary battery, and specifically, may include a lithium metal secondary battery, a lithium ion secondary battery, a lithium polymer secondary battery, a lithium ion polymer secondary battery, or the like.

In an example, the lithium secondary battery may include a cathode (e.g., positive electrode) including a cathode active material; an anode (e.g., negative electrode) including an anode active material; and an electrolyte interposed between the cathode and the anode. In addition, a separator may further be included.

The lithium secondary battery according to an embodiment of the present invention may be manufactured according to conventional methods known in the art, for example, by interposing a separator between the cathode and the anode and then introducing the electrolyte to which the electrolyte additive is added.

The electrolyte may include conventional lithium salts known in the art; and an electrolyte solvent.

As the separator, a porous separator, for example, a polypropylene-based, polyethylene-based, or polyolefin-based porous separator may be used, or an organic/inorganic composite separator including an inorganic material may be used.

Hereinafter, the present invention will be described in detail through embodiments. However, the following embodiments are only to illustrate the present invention, and the present invention is not limited by the following embodiments.

Examples 1 to 4

Example 1

For preparation of the electrolyte, it was adjusted to a copper ion concentration of 80 g/l, a sulfuric acid concentration of 100 g/l, and a chlorine concentration of 30 ppm at a temperature of 60° C. As the additives, low molecular weight gelatin (molecular weight 3,000), hydroxyethyl cellulose (HEC), 3-mercaptopropyl sulfonate (MPS) as the brightener, and thiourea as the leveler were used, and they were added with contents as shown in Table 1 below. In addition, the plating was carried out at a current density of 50 A/dm$^2$ to prepare a plating with a thickness of 15 μm according to the drum speed adjustment. Then, chromium (Cr) treatment was performed through immersion in a small tank to give anti-rust ability.

The prepared electrolytic copper foil was sampled in three places (left, middle, right) with a full width (1300 mm*500 mm), and the physical properties of the electrolytic copper foil were measured as in the following Experimental Examples. In addition, after heat treatment at 200° C. for 1 hour, the physical properties of the electrolytic copper foil were measured as in the following Experimental Examples.

Example 2

An electrolytic copper foil of Example 2 was prepared in the same manner as in Example 1, except that the contents of HEC and brightener as the additives to be added to the electrolyte were changed as shown in Table 1 below. Then, in the same manner as in Example 1, the physical properties of the electrolytic copper foil before and after heat treatment were measured, respectively.

Example 3

An electrolytic copper foil of Example 3 was prepared in the same manner as in Example 1, except that the contents of HEC and brightener as the additives to be added to the electrolyte were changed as shown in Table 1 below. Then, in the same manner as in Example 1, the physical properties of the electrolytic copper foil before and after heat treatment were measured, respectively.

Example 4

An electrolytic copper foil of Example 4 was prepared in the same manner as in Example 1, except that the chlorine concentration was controlled to 5 ppm or less, and the content of each of the low molecular weight gelatin, HEC, brightener, and leveler as the additives added to the electrolyte was changed to 5 ppb. Then, in the same manner as in Example 1, the physical properties of the electrolytic copper foil before and after heat treatment were measured, respectively.

TABLE 1

|  | Additives (ppb) | | | |
| --- | --- | --- | --- | --- |
|  | Low molecular weight gelatin | HEC | Brightener | Leveler |
| Example 1 | 3500 | 1500 | 1000 | 10 |
| Example 2 | 3500 | 2500 | 500 | 10 |
| Example 3 | 3500 | 1500 | 500 | 10 |
| Example 4 | 5 | 5 | 5 | 5 |
| Comp. Ex. 1 | 3500 | 1500 | — | — |
| Comp. Ex. 2 | 3500 | 1500 | 1000 | 150 |
| Comp. Ex. 3 | 3500 | 1500 | 500 | 150 |

Comparative Examples 1 to 3

Comparative Example 1

An electrolytic copper foil of Comparative Example 1 was prepared in the same manner as in Example 1, except that the brightener and the leveler were not used as additives to be added to the electrolyte. Then, in the same manner as in Example 1, the physical properties of the electrolytic copper foil before and after heat treatment were measured, respectively.

Comparative Example 2

An electrolytic copper foil of Comparative Example 2 was manufactured in the same manner as in Example 1, except that the content of the leveler as the additive added to the electrolyte was changed as shown in the above Table 1. Then, in the same manner as in Example 1, the physical properties of the electrolytic copper foil before and after heat treatment were measured, respectively.

Comparative Example 3

An electrolytic copper foil of Comparative Example 3 was manufactured in the same manner as in Example 1, except that the contents of the brightener and the leveler as the additives added to the electrolyte were respectively changed as shown in the above Table 1. Then, in the same manner as in Example 1, the physical properties of the electrolytic copper foil before and after heat treatment were measured, respectively.

Experimental Example: Evaluation of Physical Properties of Electrolytic Copper Foil The physical properties of the electrolytic copper foils prepared in Examples 1 to 4 and Comparative Examples 1 to 3 were evaluated in the following manner, and the results are shown in Table 2 below.

<Method for Evaluating Physical Properties>

(1) Thickness Measurement

A thickness was measured by a unit basis weight method, which is a typical thickness measurement method of copper foil (IPC-TM-650 2.2.12).

(2) Elongation Measurement

An elongation (%) was measured using UTM (Instron, model name: 5942) in accordance with IPC-TM-650 2.4.18 standard.

(3) Tensile Strength Measurement

A tensile strength (MPa) was measured using UTM (Instron, model name: 5942) in accordance with IPC-TM-650 2.4.18 standard.

(4) Average Grain Size Measurement

Bruker's EBSD equipment was used, and a minimum pixel size was set to 100 nm or less, and a magnification was set to 10,000 times. Analysis was conducted based on the results of orientation and diffraction patterns of materials analyzed using a pattern quality map (PQ map) and an inverse pole figure map (IPF map). In such a case, the PQ Map expresses a difference in the signal intensity of the reflected electric charges (electrons) as a difference in contrast (e.g., light and dark), and is generally expressed darkly at the grain boundary because the signal is weak. In addition, the IPF Map was measured by expressing the difference in crystal direction (orientation) with color. Herein, twin means a plane that is misorientated by 60° with respect to the crystal plane, and the average grain size was measured after removing the twins.

(5) Grain Rate (G Rate) Measurement

Using the EBSD measurement results (the pattern quality map (PQ map) and the inverse pole figure map (IPF map)), a grain height along a thickness direction of the copper foil and a grain width along a width direction of the copper foil were measured, and a grain area of which a ratio of the width direction to the thickness direction is ⅓ or more was obtained.

(6) Electrical Conductivity Measurement

An electrical conductivity was measured using Keysight B2901A source measurement unit (SMU). In such a case, the copper foil was prepared to have a width of 1 mm and a length of 10 cm, and a stabile current was measured repeatedly a total of 5 times using a constant current of 0.5 A. Measurements were made by moving at intervals of 1 cm, and the measurement interval was 5 seconds.

Figure 7:
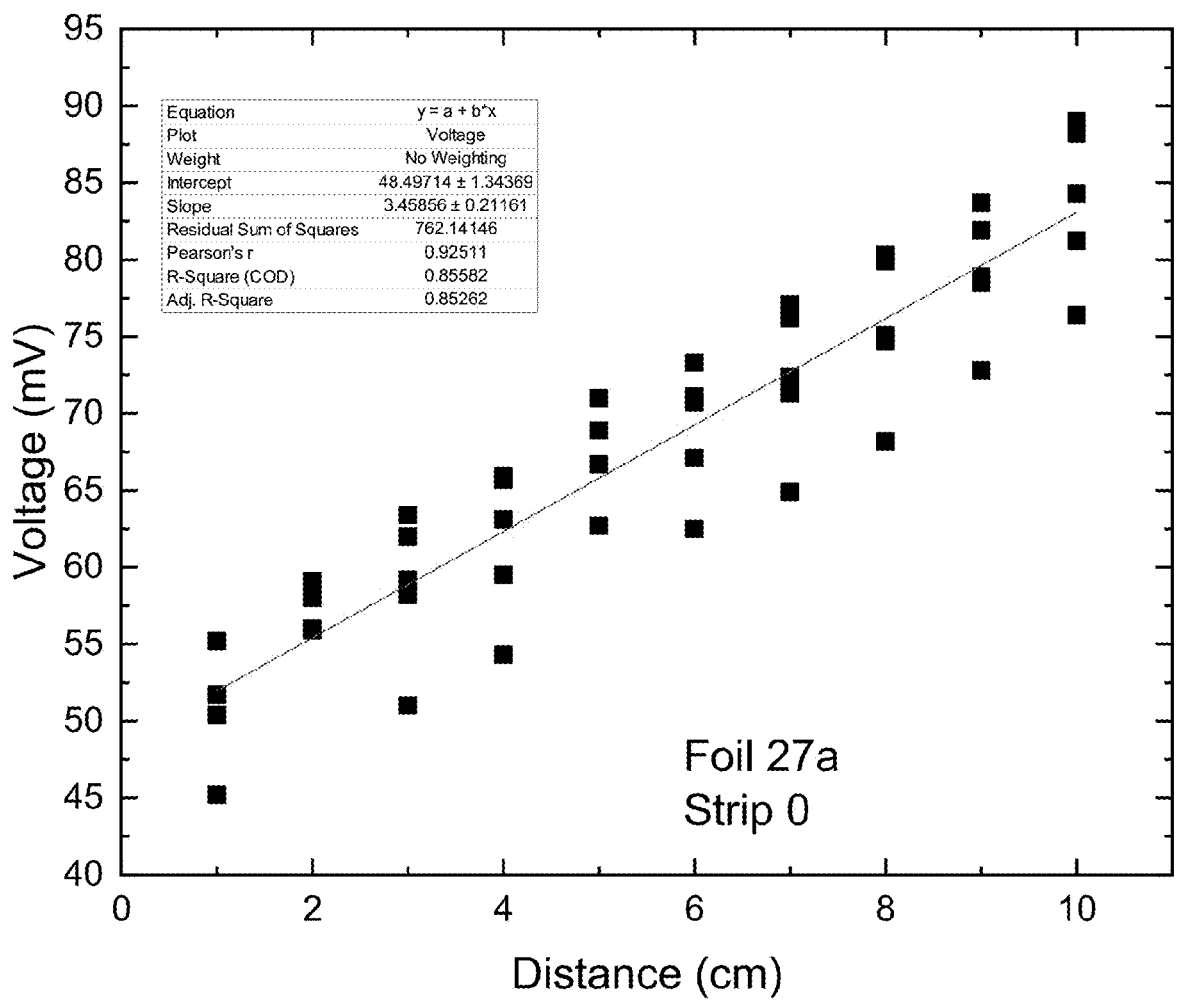
FIG. 7 is a graph illustrating changes in distance and voltage to measure electrical resistance after heat treatment of the electrolytic copper foil prepared in Example 1.

FIG. 7 is a graph illustrating changes in distance and voltage to measure electrical resistance after heat treatment of the electrolytic copper foil. Resistance was calculated by V=IR (V: voltage, I: current, R: resistance), and electrical conductivity was calculated as 1/R.

TABLE 2

|  | Tensile strength (kgf/mm$^2$) | | Elongation (%) | | Grain rate (G rate, %) | | Electrical conductivity (MS/m) | | Average grain size (μm, excluding twins) | |
|---|---|---|---|---|---|---|---|---|---|---|
|  | Before heat treatment | After heat treatment | Before heat treatment | After heat treatment | Before heat treatment | After heat treatment | Before heat treatment | After heat treatment | Before heat treatment | After heat treatment |
| Ex. 1 | 34.2 | 32.4 | 12.5 | 14.7 | 73 | 89 | 42.0 | 44.6 | 5.1 | 5.7 |
| Ex. 2 | 33.6 | 32.5 | 14.3 | 16.5 | 67 | 82 | 42.4 | 44.1 | 5.5 | 6.2 |
| Ex. 3 | 35.2 | 33.7 | 10.7 | 12.5 | 38 | 57 | 40.8 | 41.5 | 4.6 | 5.5 |
| Ex. 4 | 55.7 | 27.8 | 5.2 | 22.2 | 4 | 93 | 39.5 | 45.9 | 1.9 | 6.8 |
| Comp Ex. 1 | 35.4 | 33.1 | 6.6 | 7.4 | 26 | 38 | 40.3 | 39.7 | 4.8 | 5.9 |
| Comp Ex. 2 | 57.8 | 53.5 | 7.2 | 8.8 | 12 | 22 | 37.9 | 37.6 | 2.3 | 4.7 |
| Comp Ex. 3 | 63.7 | 59.8 | 4.8 | 5.5 | 7 | 18 | 37.3 | 36.7 | 1.8 | 3.1 |

What is claimed is:

1. An electrolytic copper foil comprising:
a copper layer including one surface and another surface, wherein the copper layer includes a plurality of grains, and when analyzed by electron backscatter diffraction (EBSD) after heat treatment at 200° C. for 1 hour, a grain rate (G rate) defined in Equation 1 is 50% or more:

Grain rate (G rate,%)=$G_{1/3}/G_T$≥50,  [Equation 1]

in Equation 1,
$G_T$ is a total area of grains comprised in the heat-treated electrolytic copper foil, and
$G_{1/3}$ is a total area of grains of which a ratio (a/b) of a maximum length in a width direction (a) to a maximum length in a thickness direction (b) of a unit grain excluding twin boundaries in the heat-treated electrolytic copper foil is ⅓ or more.

2. The electrolytic copper foil of claim 1, wherein when analyzed by EBSD after heat treatment at 200° C. for 1 hour, the grate rate (G rate) is in a range from 50 to 97%.

3. The electrolytic copper foil of claim 1, wherein an average grain size, excluding twins, after heat treatment is in a range from 4 to 10 μm, and
an average grain size (excluding twins) before heat treatment is in a range from 1 to 6 μm.

4. The electrolytic copper foil of claim 1, wherein an electrical conductivity of the electrolytic copper foil after heat treatment is 1.5% or more greater as compared to an electrical conductivity of the electrolytic copper foil before heat treatment.

5. The electrolytic copper foil of claim 1, wherein an electrical conductivity of the electrolytic copper foil after heat treatment is in a range from 40 to 55 MS/m, and
an electrical conductivity of the electrolytic copper foil before heat treatment is in a range from 38 to 45 MS/m.

6. The electrolytic copper foil of claim 1, wherein an elongation after heat treatment is 10% or more, and
a tensile strength after heat treatment is 38 kgf/mm$^2$ or less.

7. The electrolytic copper foil of claim 1, wherein a thickness of the electrolytic copper foil is in a range from 3 to 70 μm.

8. The electrolytic copper foil of claim 1, wherein a roughness of each of the one surface and the another surface of the electrolytic copper foil is in a range from 0.5 to 5.0 μm, and
a difference in surface roughness between the one surface and the another surface is 1.0 μm or less.

9. The electrolytic copper foil of claim 1, further comprising an anti-corrosion layer formed on a surface of the electrolytic copper foil,
wherein the anti-corrosion layer comprises chromium (Cr), molybdenum (Mo), nickel (Ni), a silane compound, a nitrogen compound, or a combination thereof.

10. The electrolytic copper foil of claim 1, wherein the electrolytic copper foil is formed through electroplating in which a current is applied between an electrode plate and a rotating drum which are spaced apart from each other in an electrolyte, and
the electrolyte comprises 50 to 150 g/l of copper ions, 50 to 150 g/l of sulfuric acid, 1 to 100 ppm of halogen, 3 to 1500 ppb of a brightener, 3 to 4000 ppb of a low molecular weight gelatin, 3 to 3000 ppb of hydroxyethyl cellulose (HEC), and 1 to 20 ppb of a leveler.

11. The electrolytic copper foil of claim 1, applied as an anode current collector for a lithium secondary battery.

12. An electrode for a secondary battery, comprising:
the copper foil of claim 1, and
an active material layer disposed on the copper foil.

13. The electrode of claim 12, wherein when analyzed by EBSD after heat treatment at 200° C. for 1 hour, the grate rate (G rate) is in a range from 50 to 97%.

14. The electrode of claim 12, wherein an average grain size (excluding twins) after heat treatment is in a range from 4 to 10 μm, and an average grain size, excluding twins, before heat treatment is in a range from 1 to 6 μm.

15. The electrode of claim 12, wherein an electrical conductivity of the electrolytic copper foil after heat treatment is 1.5% or more greater as compared to an electrical conductivity of the electrolytic copper foil before heat treatment.

16. The electrode of claim 12, wherein an electrical conductivity of the electrolytic copper foil after heat treatment is in a range from 40 to 55 MS/m, and
   an electrical conductivity of the electrolytic copper foil before heat treatment is in a range from 38 to 45 MS/m.

17. The electrode of claim 12, wherein an elongation after heat treatment is 10% or more, and
   a tensile strength after heat treatment is 38 kgf/mm2 or less.

18. The electrode of claim 12, wherein a roughness of each of the one surface and the another surface of the electrolytic copper foil is in a range from 0.5 to 5.0 μm, and
   a difference in surface roughness between the one surface and the another surface is 1.0 μm or less.

19. The electrode of claim 12, further comprising an anti-corrosion layer formed on a surface of the electrolytic copper foil,
   wherein the anti-corrosion layer comprises chromium (Cr), molybdenum (Mo), nickel (Ni), a silane compound, a nitrogen compound, or a combination thereof.

20. A secondary battery comprising the electrode of claim 12.

* * * * *